(No Model.)
J. GUARDIOLA.
COFFEE HULLER.
No. 339,288. Patented Apr. 6, 1886.
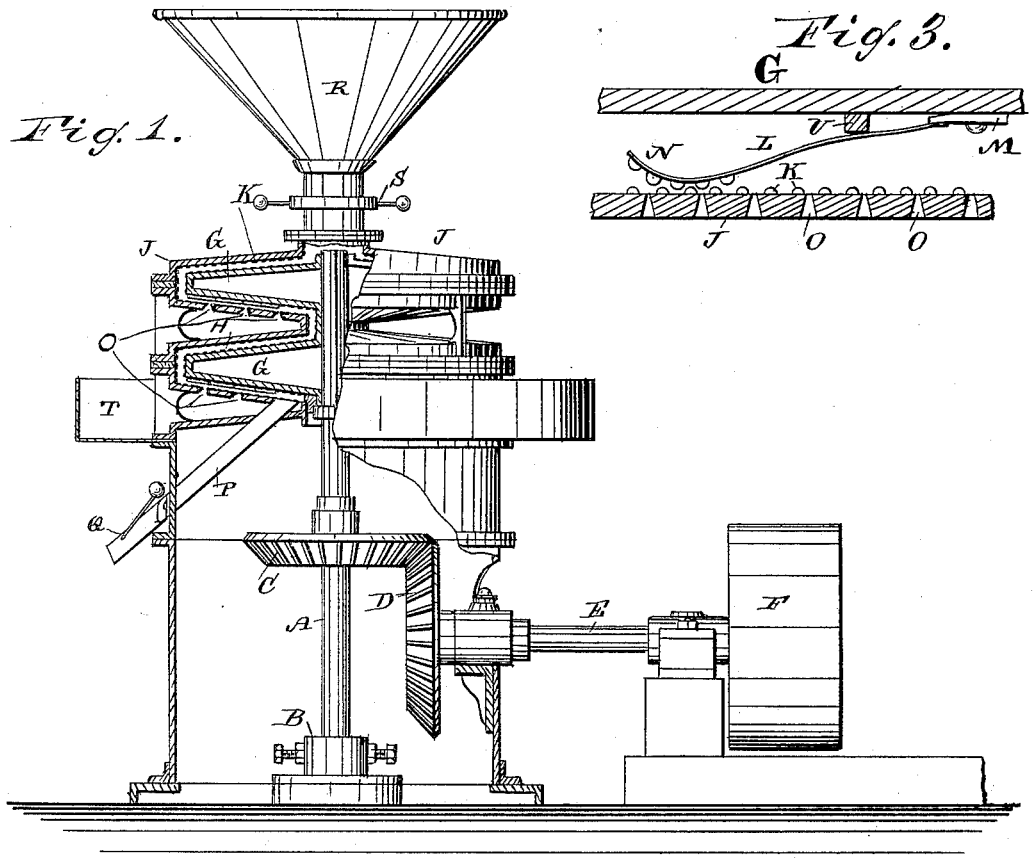
Fig. 1.
Fig. 3.
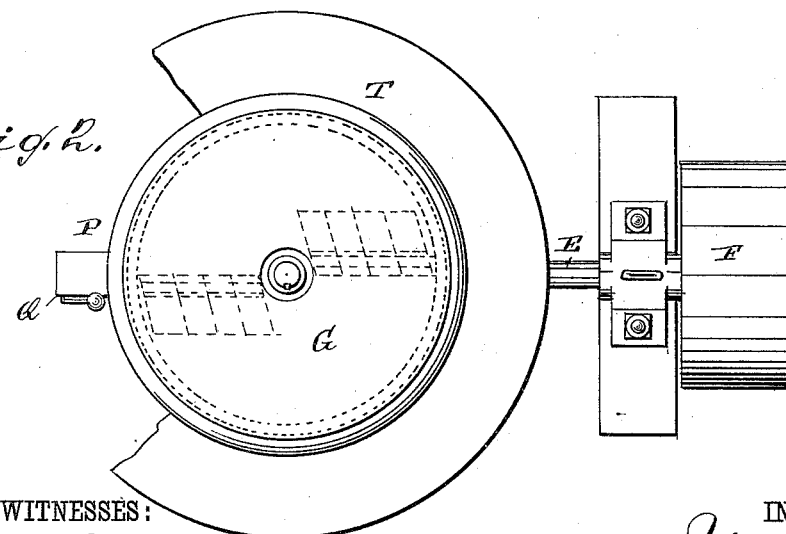
Fig. 2.
WITNESSES:
Theo. G. Hoster
C. Sedgwick
INVENTOR:
J. Guardiola
BY Munn & Co.
ATTORNEYS.

UNITED STATES PATENT OFFICE.

JOSE GUARDIOLA, OF CHOCOLA, GUATEMALA.

COFFEE-HULLER.

SPECIFICATION forming part of Letters Patent No. 339,288, dated April 6, 1886.

Application filed June 18, 1885. Serial No. 169,056. (No model.)

*To all whom it may concern:*

Be it known that I, JOSE GUARDIOLA, of Chocola, Guatemala, have invented a new and Improved Coffee-Huller, of which the following is a full, clear, and exact description.

The object of my invention is to provide a new and improved machine of simple construction for hulling coffee.

The invention consists of the combinations of parts, including their construction, substantially as hereinafter described, and pointed out in the claims.

Reference is to be had to the accompanying drawings, forming part of this specification, in which the same letters of reference indicate the same or corresponding parts in all the figures.

Figure 1 is a partial side and sectional view of my improved machine for hulling coffee. Fig. 2 is a plan view of the same, parts being broken out. Fig. 3 is an enlarged detail longitudinal sectional view of one of the hulling-plates, a portion of one of the disks, and portion of the inclosing-casing.

The vertical shaft A is mounted in the step B, and carries a bevel cog-wheel, C, engaging with a bevel cog-wheel, D, on a horizontal shaft, E, carrying a belt-pulley, F. On the shaft A two horizontal double conical disks, G, are mounted—that is, the diameters of the disks decrease from the middle toward the rims. The disks are hollow and made of cast-iron or of any other suitable material, and the two disks can be made as one piece, or they may be cast separately and secured on the shaft. On the outer surfaces of the same numerous teats or projections H are formed.

The disks G are surrounded by a casing, J, made to conform to the shape of the disks, and on the inner surface of the said casing numerous projections or teats K are formed.

To the under side of each disk G is connected, by leather pieces M or other flexible material, a series of rubbing or hulling plates, L, which have their greater portions inclined downwardly, while their lower ends are curved or inclined upwardly, the lower extremities of which downwardly-inclined portions are arranged in proximity to the teats or projections K of the casing J.

The free ends of the plates L are slightly rounded or turned up, and on the curved surfaces teats or projections N are formed, which rest upon the projections of the casing, as shown in Fig. 3.

The plates L are made of copper or other suitable material.

The under sides of those parts of the casing J surrounding the disks G are provided with apertures O, increasing in diameter from their tops to their bottoms. A chute, P, having a gate, Q, extends downward and outward from the casing J. A hopper, R, having a slide-valve, S, is held on the top of the casing.

A circular gutter, T, for catching the chaff, &c., is provided around and below that part of the casing surrounding the lower disk, G. If desired, the strips L can rest against cleats U, to increase their spring-tension.

The operation is as follows: The coffee-berries to be hulled are poured into the hopper R, and pass from the same into the casing and upon the disks G, which are revolved about two hundred times per minute. The berries are rubbed between the projections of the casing and the disks, or between the casing and the plates L, and thus the hulls or shells are broken and removed from the berries. A large part of the chaff passes through the apertures O and into the gutter or trough T, and the berries, after passing over both disks, slide down the chute P. As a great part of the chaff passes off through the apertures O, the subsequent cleaning is accomplished much more easily.

If desired, an exhausting-fan can be connected with the casing, for drawing off the chaff and facilitating the separation of the chaff and berries.

Having thus described my invention, what I claim as new, and desire to secure by Letters Patent, is—

1. In a coffee-huller, the combination, with a vertical revolving shaft, of disks mounted on the same and having their top and bottom surfaces beveled or tapered from their centers toward their rims, on which surfaces projections or teats are formed, and a casing conforming to the shape of the disks and provided with projections or teats on its inner surfaces, substantially as herein shown and described.

2. In a coffee-huller, the combination, with a vertical revolving shaft, of disks mounted on the same and provided with teats or projections on the surfaces, a casing conforming to the shape of the disks and having teats or projections, and plates hung on the disks and having teats or projections on their free ends, substantially as herein shown and described.

3. In a coffee-huller, the combination, with a vertical revolving shaft, of the disks G on the same, the casing J, the plates L, and the flexible pieces M, substantially as herein shown and described.

4. In a coffee-huller, the combination, with a vertical revolving shaft, of disks mounted on the same and having their top and bottom surfaces beveled from their centers to their rims, and also having teats or projections on said surfaces, a casing conforming to the shape of the disks and having teats or projections, and also apertures O in the parts below the disks, substantially as herein shown and described.

The foregoing specification of my improved disk coffee-huller signed at New York this 5th day of June, 1885.

J. GUARDIOLA.

Witnesses:
  EDGAR TATE,
  WM. W. LUYSTER.